US008812612B1

United States Patent
Laier et al.

(10) Patent No.: US 8,812,612 B1
(45) Date of Patent: Aug. 19, 2014

(54) VERSIONED COALESCER

(75) Inventors: Max Laier, Seattle, WA (US); John Benjamin Brazel, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 194 days.

(21) Appl. No.: 13/452,491

(22) Filed: Apr. 20, 2012

(51) Int. Cl.
*G06F 15/167* (2006.01)

(52) U.S. Cl.
USPC .......................................................... 709/213

(58) Field of Classification Search
CPC .................................. H04L 67/2852
USPC .......................................................... 709/213
See application file for complete search history.

(56) References Cited

U.S. PATENT DOCUMENTS 8,341,363 B2 * 12/2012 Chou et al. ..................... 711/162
2011/0258461 A1 * 10/2011 Bates ............................. 713/190

* cited by examiner

*Primary Examiner* — Yves Dalencourt
(74) *Attorney, Agent, or Firm* — Sean M. Evans; Theodore Chen; Krishnendu Gupta

(57) ABSTRACT

The various embodiments are directed towards enabling a versioned coalescer to defer when data blocks cached in unstable storage may be flushed to stable storage. In at least one of the various embodiments, deferring the flushing of cached data blocks until they are read may avoid having to periodically suspend cache operations to flush all cached data from unstable storage to stable storage. In at least one of the various embodiments, if data blocks may be written, a versioned coalescer may cache the data blocks in a high-performance node cache that may be dedicated to a node in a distributed file system. Further, if a process requires a snapshot of at least a portion of the file system a versioned coalescer may examine the node caches for each node. If a node cache contains relevant data blocks the versioned coalescer may insert a snapshot sentinel into the node cache.

24 Claims, 10 Drawing Sheets

US 8,812,612 B1

VERSIONED COALESCER

TECHNICAL FIELD

Various embodiments relate generally to managing data caching in a file system, and more particularly to, improving performance by enabling file system cache flushing to be deferred to increase computing performance.

BACKGROUND

High performance computing often requires access to data and files stored on relatively slow non-volatile stable storage devices, such as hard drives. Overall computing performance may be improved by improving file access performance. Caches that use high-speed volatile storage placed close to the data write source may often improve high performance file and data access. Data caches may improve performance by reducing the time and overhead required for writes to complete. However, data caches that use volatile unstable storage may lose data if there are power outages or other failure events. Accordingly, data caches may be arranged to regularly flush data from volatile unstable storage to non-volatile stable storage.

Often, data caching must be suspended while flushing file data from high-speed unstable storage to slower stable storage. Otherwise, as data may be moved from unstable storage to stable storage new data may be written into the data cache at the same time data may be in the process of being moved to stable storage. This may make it difficult or impossible to avoid data and file system inconsistency.

Also, for computing systems with large and/or distributed data caching facilities it may take a relatively long time for file data caches to be flushed from unstable storage to stable storage. Suspending data caching for a long period of time may significantly impact the performance of computing systems. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the subject claimed herein, reference will be made to the following Detailed Description Of The Embodiments, which is to be read in association with the accompanying drawings, wherein:

DETAILED DESCRIPTION OF THE VARIOUS EMBODIMENTS

Figure 1:
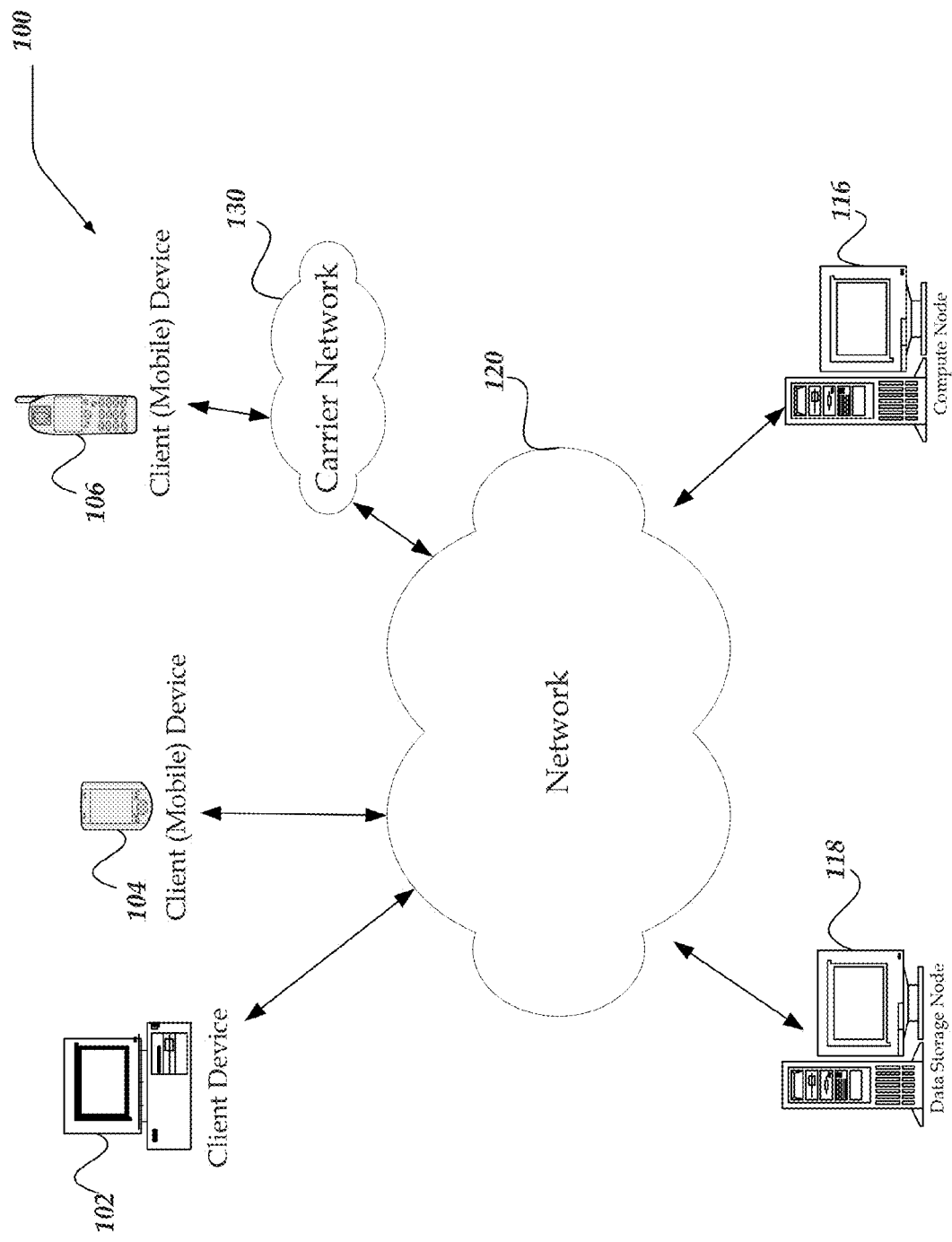
FIG. 1 illustrates a system in which in at least one of the various embodiments of the may operate.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

"Writer," or "writers" as used herein refer to threads, processes, applications, or the like, that may be writing data, or trying to write data, to a file on a file system. Likewise, "reader," or "readers," as used herein refer to threads, processes, applications, or the like, that may be reading, or trying to read data, from a file on a file system. Readers and/or writers may be part of the same process or application, as in the case of threads, or they may be in separate processes or applications. Further, they may be running on the same computing device or on one or more separate computing devices.

"Snapshot" as used herein refers to a read-only preserved version of files or other data in a file system. In at least one of the various embodiments, the content of a snapshot may be preserved at the time the snapshot was created. Thus, a process or application working with a snapshot may be ensured that the data in the snapshot may exist and it may remain unchanged. However, this may apply if the data in question has been read at least once by any process on any node. Thus, if data associated with a snapshot is lost before it has been read, at least once, that data may not be considered part of the snapshot. In other words, in at least one of the various embodiments, data may not be ensured to be part of a snapshot until it has been read at least once. In at least one of the various embodiments, data assigned to snapshot may remain in unstable storage until a reader requests to the read the snapshot version of the data. At that time, if the data may be available it may be flushed to stable storage becoming a fully realize part of the snapshot version.

Also, snapshots may be useful in distributed file systems where many writers may be adding data to a file. Creating snapshots enables the files and data associated with the snapshot to be frozen at a particular time and may useful for a variety of reasons, such as, data analysis, point-in-time backups, or the like.

"Stable storage" as used herein refers to a classification of computer data storage technology and devices that may be resistant to some hardware, software, and power failures. In at least one of the various embodiments, storage devices for stable storage may often be block devices such as, magnetic platter hard disks, solid state hard drives, optical drives, or the like. Also, stable storage may be achieved using techniques such as, mirroring data on separate hard disks via RAID technology (level 1 or greater), replication of data on separate nodes and/or computing devices, or the like. In general, once data has reached stable storage clients and users may assume that the data may not be lost or corrupted.

"Unstable storage" as used herein refers to a classification of computer data storage technology and device that may not be resistant to some hardware, software, and power failures. Read and write access to unstable storage may often be very fast compared to stable storage. However, if there may be a power failure or application/system crash, data in affected unstable storage may often be lost and unrecoverable. In at least one of the various embodiments, unstable storage may be implemented using RAM, DRAM, SRAM, or the like, that may lose data if power is lost. In some references, unstable storage may be referred to as volatile storage or volatile memory. In general, users may not assume that data stored in unstable storage may not be lost or corrupted.

"Node" as used herein refers to virtual or physical computing devices, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

"Node cache" as used herein refers to unstable storage associated with a node a in cluster. In at least one of the various embodiments, each node may have a dedicated node cache that may store data blocks written by the node. Node caches may enable faster data writes because the data blocks may be stored in unstable storage that may be much faster to access than stable storage. In at least one of the various embodiments, if required the data blocks contained in the node cache may be flushed to stable storage.

The following briefly describes at least one of the various embodiments, in order to provide a basic understanding of some aspects of the claimed subject matter. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, the various embodiments are directed towards enabling a versioned coalescer to defer when data blocks cached in unstable storage may be flushed to stable storage. In at least one of the various embodiments, deferring the flushing of cached data blocks until they are read may avoid having to periodically suspend cache operations to flush all cached data from unstable storage to stable storage. In at least one of the various embodiments, if data blocks may be written, a versioned coalescer may cache the data blocks in a high-performance node cache that may be dedicated to a node in a distributed file system.

Further, if a process requires creation of a snapshot of at least a portion of the file system, in at least one of the various embodiments, a versioned coalescer may examine the node caches for each node. If a node cache contains relevant data blocks the versioned coalescer may insert a snapshot sentinel into the node cache. After, the snapshot sentinels have been inserted into the node caches that may contain relevant data blocks the snapshot may be made available for in the distributed file system.

If a data block stored in a node cache may be read by another process the data block may be flushed to from the node cache to stable storage before returning the data to the reader. In at least one of the various embodiments, if data associated with a snapshot may be read, a versioned coalescer may identify the data blocks in the node caches that may be associated with the snapshot by examining the node caches looking for snapshot sentinels corresponding to the snapshot. In at least one of the various embodiments, if the read request includes data blocks that may be associated with a snapshot, the associated data blocks stored in node caches may be flushed to stable storage before returning the data block contents to the reader. Further, in at least one of the various embodiments, if the data blocks may be flushed from the node cache to stable storage the flushed data blocks may be removed from the node cache.

Illustrative Operating Environment

FIG. 1 illustrates an a system in which in at least one of the various embodiments of the may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, carrier network 130, one or more Data Storage nodes 118, and one or more Compute Accelerator Nodes 116. Network 120 is in communication with and enables communication between each of the elements of system 100. Carrier network 130 further enables telephonic communication with wireless communication devices such as mobile device 104.

Client devices 102-106 may include virtually any computing device capable of receiving and sending a message over a network, and/or to and from another computing device. The set of such devices may include devices that typically connect using a wired communications medium such as personal computers, tablet computers, multiprocessor systems, microprocessor-based or programmable consumer electronics, network PCs, or the like. Further, client devices 102-106 may include any device that is capable of connecting via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB)

radio devices, or any other device that is equipped to communicate over a wireless communication medium. Client devices may also include integrated devices combining one or more of the preceding devices and/or elements of one or more of these devices.

Each client device within client devices 102-106 may include a browser application that is configured to send, receive, and display web pages, or the like. The browser application may be configured to receive and display graphics, text, multimedia, or the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, or the like. Client devices 102-106 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, or the like. Client devices 102-106 may further include a voice over IP (VoIP) application that enables voice communication over network 120 separate from carrier network 130.

Network 120 is configured to couple one computing device to another computing device, enabling them to communicate. Network 120 is enabled to employ any form of medium for communicating information from one electronic device to another. Also, network 120 may include a wireless interface, and/or a wired interface, such as the Internet, Cloud Computing, or the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), or the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Carrier network 130 may include wireless interfaces, wireless forms of communication, and/or wireless links such as cellular networks, satellite links, Infra-Red, Micro-Wave links, Open Air Laser links, or the like. These wireless links may include various mobile communication protocols such as wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), or the like.

The medium used to transmit information in mobile communication links as described above may generally include any communication medium or media that can be accessed by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, or the like. By way of example, communication media includes wireless media such as fluids or space for acoustic, RF, infrared, and other wireless signals, and wired media such as twisted pair, coaxial cable, fiber optics, wave guides, and other wired media.

Data Storage Node(s) 118 and Compute Node(s) 116 may comprise multiple computing devices, components of a single computing device, or a single device with multiple software features. In at least one of the various embodiments, Data Storage Node 118 and Compute Node 116 may include file systems, caching systems, and snapshot systems, embodiments of which may be further described below. In some embodiments, Data Storage Node(s) 118 and/or Compute Node(s) 116 may comprise a cluster of network devices, such that functionality is shared among the network devices of the cluster in a load-balanced and/or parallel processing. In some embodiments, system 100 may include load balancers (not shown) or other network devices that manage the load balancing of tasks among Data Storage Node(s) 118 and/or Compute Node(s) 116 respectively.

In some embodiments, Data Storage Node(s) 118 and Compute Node(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-106 may access data and guest application(s) installed on Data Storage Nodes 118 and Compute Node 116.

Figure 2:
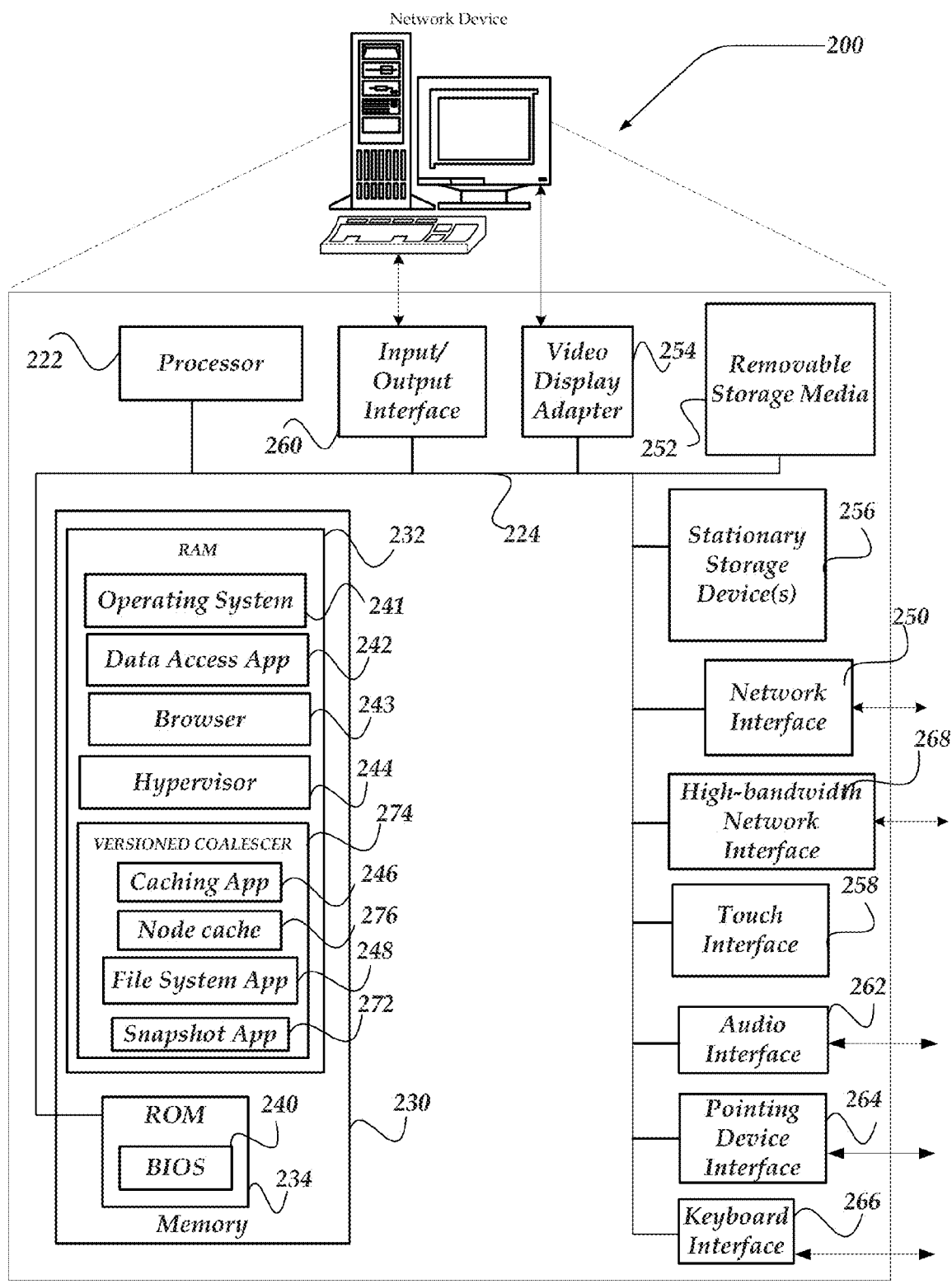
FIG. 2 shows one a network device in accordance with at least one of the embodiments.

FIG. 2 shows one embodiment of a network device, in accordance to at least one of the embodiments. Network device 200 may include many more, or fewer, components than those shown. The components shown, however, are sufficient to disclose an illustrative embodiment. Network device 200 may represent, for example, Data Storage Node 118, and Compute Node 116 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 230 can be utilized by network device 200 to store programs, applications, software modules, or the like, as well as the data used by such programs, applications, and/or software modules. Applications may comprise processor executable instructions which can be executed by network device 200. Programs in mass memory 230 may include a browser application 243. Browser 243 may run under the control of operating system 241 to transmit, receive, render, and/or otherwise process documents of various formats (e.g. PDF, Word, Excel, or the like), markup pages such as HTML pages, XML pages, WAP pages (sometimes referred to as WAP cards), or the like, and/or multimedia content (e.g., audio, video, graphics), and any other form of content deliverable over the web. Mass memory 230 may also include Hypervisor 244 which may manage virtual machines and guest applications that may be executing on the network device. Memory 230 may further include Data Access application 242 which may enable access to data stored on storage devices. Additional applications included in Memory 230 may include one or more versioned coalescers 274 that may manage caching, creating snapshots, and reading from snapshots within a distributed file system. In at least one of the various embodiments, versioned coalescer 274 may comprise caching applications 246 that may manage read and write data caching associated network device 200 and/or across the one or more nodes in the cluster, one or more file system applications 248 that may enable reading and writing of files that may be located on network device 200 and/or distributed among nodes in the cluster in accordance with the at least one of the various embodiments, one or more node caches 276 for storing cached data and associated meta-data, and one or more snapshot applications 272 that may create and manage file system snapshots in accordance with at least one of the various embodiments. In at least one of the various embodiments, versioned coalescers 274 may operate on each node in a cluster and may further operate in coordination with other versioned coalescers that may be operating within the cluster.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 254. The user interface can also include touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash memory drive, hard drive, a floppy disk drive, tape drive, and/or any other type of processor readable non-transitory storage media. Stationary storage device 256 or removable storage media 252 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet or the like, with a wide area network such as the Internet, Cloud Network, a local area network, a wired telephone network, a cellular telephone network, or some other communications network, such as networks 120 and/or carrier network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

Generalized Operation

In at least one of the various embodiments, high performance computing environments may improve performance by utilizing caching if writing to the computing systems' file system.

Figure 3:
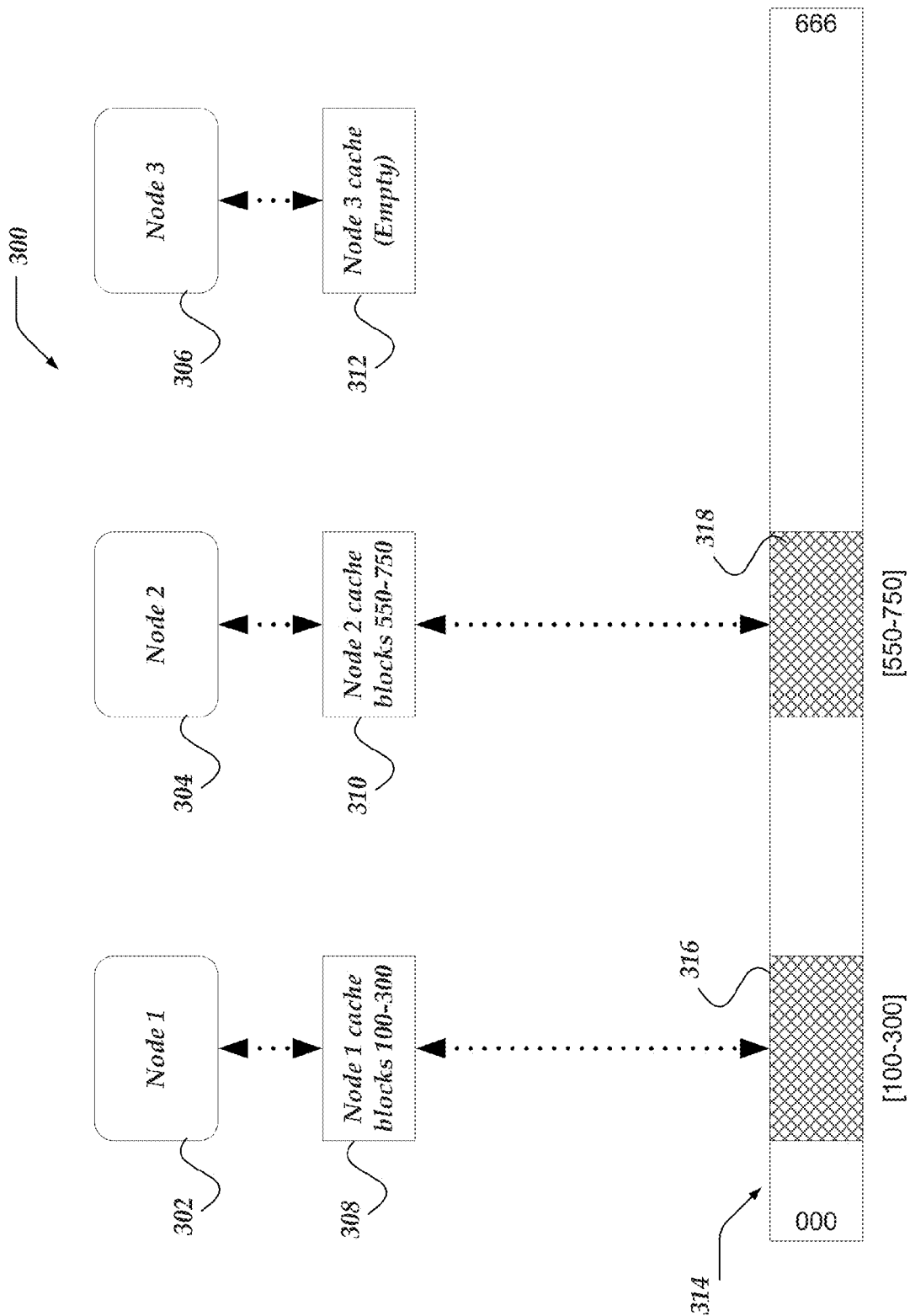
FIG. 3 illustrates a logical schematic of distributed file system in accordance with the at least one of the various embodiments.

FIG. 3 illustrates for at least one of the various embodiments a logical schematic of distributed file system 300 that may employ a versioned coalescer for caching and/or improved file system performance. In at least one of the various embodiments, nodes 302-306 may be operating in a clustered distributed file system. In at least one of the various embodiments, each node 302-306 may have a dedicated node cache, such as node caches 308-312, for caching file data writes. In at least one of the various embodiments, nodes 302 and 304 may be working with file system file 314. File 314 may be logically distributed among multiple nodes in a distributed file system. In at least one of the various embodiments, file 314 may be arranged to have "1000" data blocks "000-999" where data blocks, and/or ranges of data blocks, may be addressable by individual nodes. In at least one of the various embodiments, separate nodes within a clustered distributed file system may be enabled to write data to file 314 if the nodes may be accessing separate non-overlapping data block ranges. In at least one of the various embodiments, node 302 may be depicted as writing to file data blocks 316 (e.g., data blocks "100-300" of file 314) and node 304 may be depicted as writing to file data blocks 318 (e.g., data blocks "550-750"). In at least one of the various embodiments, files may comprise any number of data blocks. Further, data blocks may not be required to be any particular size. In practice 4 kilobyte and 8 kilobyte sized data blocks may be common, but the claimed subject matter is not so limited. In at least one of the various embodiments, data blocks may be as small or as large as required by the particular application an embodiment may be directed towards.

In at least one of the various embodiments, data block writes executed by node 302 may be cached in node cache 308. Likewise, in at least one of the various embodiments, data block writes executed by node 304 may be cached in node cache 310. Conversely, since node 306 may not be writing any data blocks node cache 312 may be empty (e.g., at least node cache 312 may not include cache data blocks for file 314). In at least one of the various embodiments, data writes that may come from a node may originate from applications, clients, and users that may reside outside of the distributed file system node cluster (not shown in FIG. 3).

In at least one of the various embodiments, if node 302 writes data blocks in the block range "100-300" (316 in FIG. 3) to file 314 a versioned coalescer may store the incoming data blocks in node cache 308 rather than saving the incoming data blocks directly to stable storage corresponding to file 314. In at least one of the various embodiments, if a versioned coalescer may determine that the data blocks held in node cache 308 require flushing to stable storage corresponding to file 314 the data blocks in node cache 308 may be flushed to stable storage. Otherwise, in at least one of the various embodiments, node cache 308 may continue receiving and caching data blocks written by node 302 thereby avoiding the significant performance impact of writing each data block to stable storage.

In at least one of the various embodiments, file 314 may be stored in stable storage. In at least one of the various embodiments, if each time a writer writes data blocks to file 314 it may be advantageous to store the contents of the data blocks in an cache such as node cache 308 or node cache 310 because the writing to node 310 may be faster and have less overhead than writing the data blocks to the stable storage corresponding to file 314. In at least one of the various embodiments, this may be enabled by utilizing one or more data locking systems that may restrict access to locked data block ranges of file 314 to the node that may be executing the writes. In at least one of the various embodiments, if the versioned coalescer on a node has locked the data block ranges the node may safely cache the writes in a node cache rather than pushing each write all the way to stable storage. In at least one of the various embodiments, data blocks may remain in the node cache until the versioned coalescer indicates that the node cache may be required to flush the cached data from unstable storage to stable storage. In at least one of the various embodiments, data blocks may be removed from a node cache after being flushed to stable storage.

In at least one of the various embodiments, a versioned coalescer may be configured to automatically flush data blocks from a node cache to stable storage based on rule based policies, configuration files, user-interface driven settings, or the like. Such rule based policies may include, age of the data blocks held in the node cache, number of data blocks contained in the node cache, remaining allocated storage space, current utilization metrics of the distribute file system (e.g., during quiet periods of low utilization node caches may flushed to stable storage, or the like), or the like.

Figure 4:
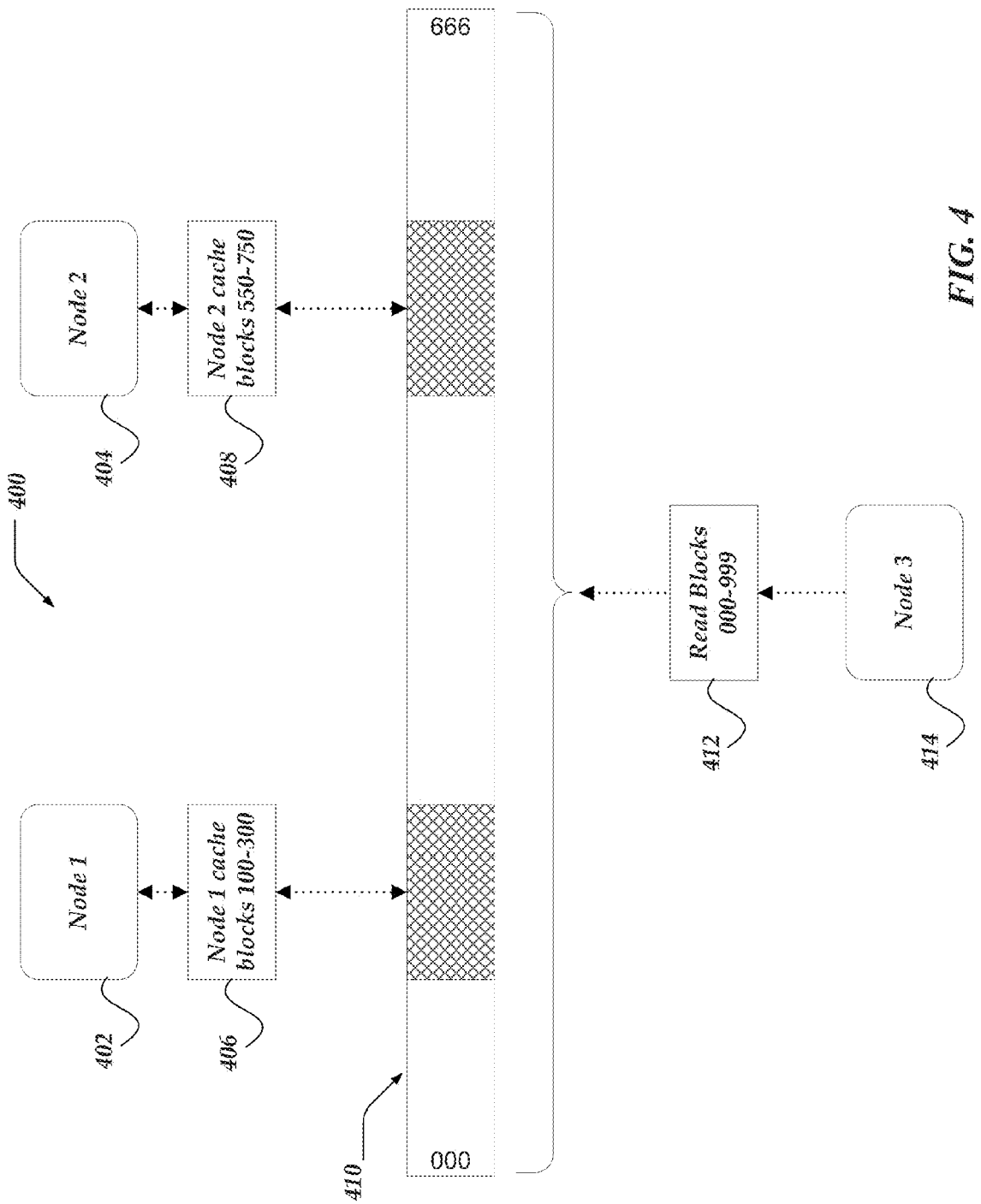
FIG. 4 illustrates a logical schematic of a distributed file system that may require node caches to be flushed to stable storage in accordance with at least one of the various embodiments.

FIG. 4 illustrates a logical schematic for at least one of the various embodiments for at least one scenario in distributed file system 400 that may require a versioned coalescer to flush node caches to stable storage. Node 402 may have locked data blocks "100-300" from file 410 (a file having "1000" data blocks). Thus, node 402 having dedicated node cache 406 may be storing data blocks in node cache 406 rather than saving each write to stable storage. Similarly, node 404 may have locked data block range "550-750" from file 410 and may be storing data block writes in node cache 408.

In at least one of the various embodiments, if a third node, node 414, requires access to the latest version of blocks "000-999" of file 410 (e.g., the entire file in this example), node 414 may make request 412 that may indicate to a locking manager, versioned coalescer, file system, or the like, that node 414 requires to read the data of file 410 block "000" through block "999". In at least one of the various embodiments, this may require a versioned coalescer to flush the contents of node cache 406 and node cache 408 to stable storage enabling node 414 to have access to the latest version of file 410. In at least one of the various embodiments, node 414's access to file 410 may be delayed while all node caches that may contain data blocks for file 410, such as node cache 406 and node cache 408, are flushed to stable storage. Further, in at least one of the various embodiments, to ensure that all data blocks relevant to file 410 may be flushed to stable storage caching operations and write operations of node 402 and node 404 may be halted until all of the node caches may be flushed to stable storage.

In at least one of the various embodiments, if node 414 requested to read data block 400-450 from file 410, node cache 406 and node cache 408 may not be required to flush their contents to stable storage. Because if node 414 requires data blocks 400-450 of file 410, node 414 may be unconcerned with the contents stored in node cache 406 and node cache 408. In at least one of the various embodiments, in these circumstances, node 402 and node 404 may continue writing and caching operations because node 414 may be unconcerned with the data block ranges that node 402 and node 404 may be writing into.

In at least one of the various embodiments, if multiple nodes have applications writing to separate parts of a file it may be difficult for an application to ensure that it may be holding the latest stable version of a file. One way to ensure that the file remains unchanged may be to take a read lock on the entire file that prevents all other writers from accessing the file. In at least one of the various embodiments, a read lock may prevent other processes from writing to the parts of file covered by a read lock. In at least one of the various embodiments, a read lock may be defined as a shared lock because multiple readers may access a file under a shared lock because readers may not alter a file.

In at least one of the various embodiments, requiring high performance distributed file systems to read lock an entire file for an extended period of time may significantly impair performance of the distributed file system. In at least one of the various embodiments, multiple writers may be writing to a file. Thus, having file level read locks that forces all interested writers to pause indefinitely may harm system performance. For example, if a process was attempting to backup a large file in a distributed file system, the file may be required to be read locked to enable a long running backup process to copy the file to backup storage. In some cases, for example, if the backup process may be writing to slow storage, such as magnetic tape based backup systems, the file being backed up may be under a full read lock for a relatively long time.

Figure 5:
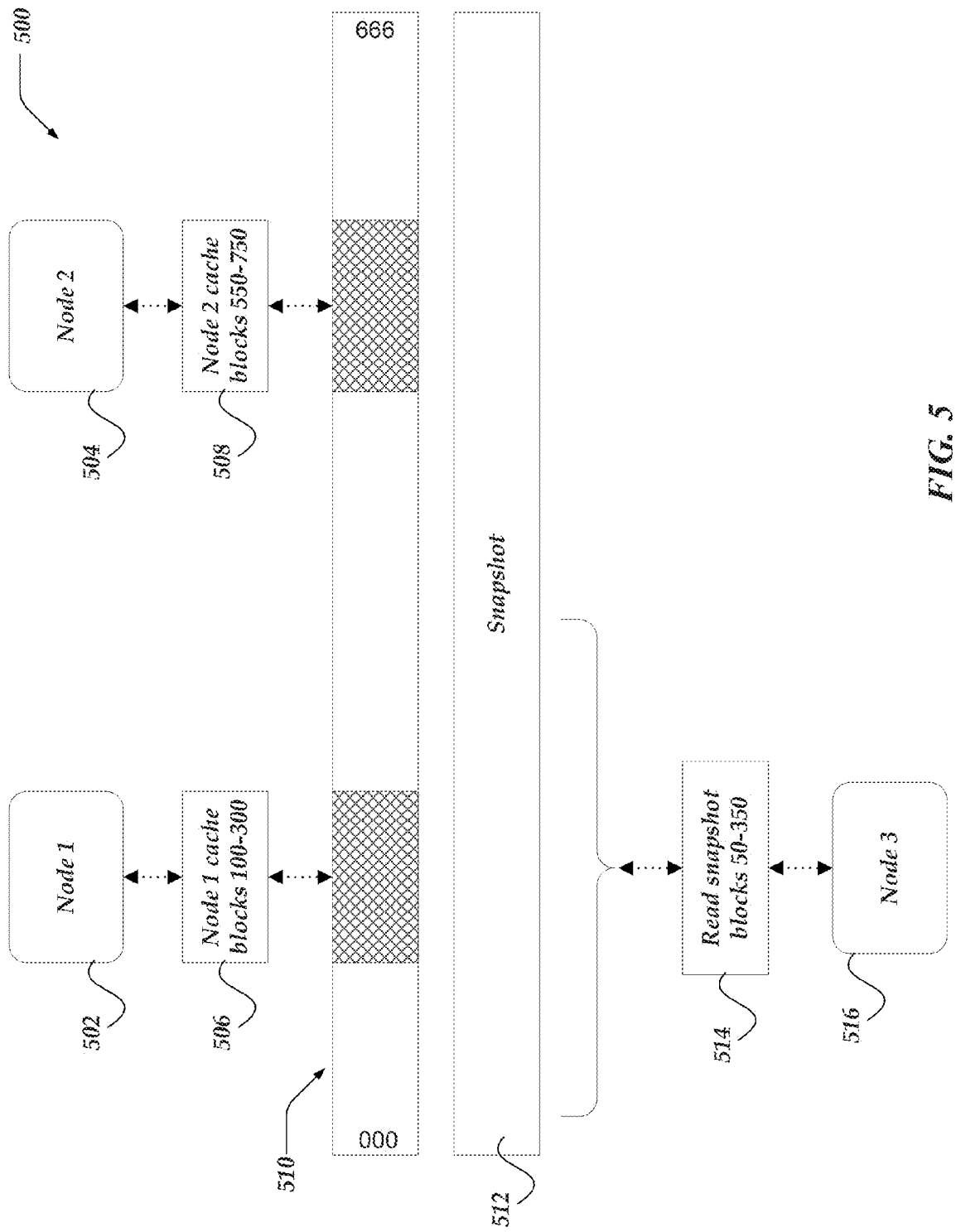
FIG. 5 illustrates a logical schematic of a distributed file system making a snapshot of a file in accordance with at least one of the various embodiments.

FIG. 5 illustrates a logical schematic for at least one of the various embodiments for at least one scenario in distributed file system 500 of making a snapshot of a file that may be a copy of the file at a specific point in time. Snapshots may be useful in situations where other writers may be likely to modify a file while another process working with the file may require the file to be in a stable state. In at least one of the various embodiments, a process may be ensured that the contents of a snapshot of the file may not change even though the source file continues to be modified by other writers in a distributed file system. For example, a long running process such as backing up to magnetic tape requires the files being backed up to remain stable while the backup-to-tape operation is in process. If the file may be altered by other writers in the middle of the backup process there may be problems related to the integrity of the backup version, including making difficult or impossible to restore the file from the backup tape, causing incorrect checksums, invalid delta values, or the like.

Accordingly, files being backed up may need to be in a stable state during the backup process. In at least one of the various embodiments, if the file may be very large with multiple interested writers, as may be common with distributed file systems in high performance computing environments, it may take a such a long time to back up a large file that processing performance may be impacted by requiring the file to be locked for the entire backup process. In at least one of the various embodiments, the file, or files, involved in the backup may be preserved by making a snapshot of the necessary files before starting a backup process (or any other process that may be sensitive to writes). In at least one of the various embodiments, snapshot 512 may be arranged so the distributed file system ensures a data block read from a snapshot remains the unchanged each time that same data block is read from the snapshot. Snapshot 512 may be a version of file 510 that readers may rely on to always return the same result when read.

In at least one of the various embodiments, a versioned coalescer may generate a snapshot by suspending writing and caching of the source file(s) for the snapshot until the snapshot process may be completed. In some cases, creating a snapshot of a large file may significantly impact performance for some writer applications because caching and writing to files during the snapshot process may be suspended. In at least one of the various embodiments, the length of time for making snapshots and the time required for suspending caching and writing operations may be mitigated by limiting the size of the node caches and file size. Because, as expected larger capacity node caches or larger source files may increase the time it may take to create a snapshot of the because there may be more data blocks to copy.

In at least one of the various embodiments, an alternative way to generate a snapshot may avoid suspending the operation of the node caching and/or writing operation by associating snapshot sentinels in the node caches that may correspond to the snapshot rather than flushing to node cache at the time the snapshot may be generated.

In at least one of the various embodiments, if snapshot 512 may be created from file 510 the versioned coalescer may be required to account for nodes, such as, node 502 having writes to file 510 stored in node cache 506. Likewise, a versioned coalescer creating a snapshot may also have to account for node 504 having writes to file 510 in stored in node cache 508. In at least one of the various embodiments, the data blocks relevant to a snapshot that may be stored in node caches may be in unstable storage. Thus, these data blocks may require special handling to ensure that the snapshot actually preserves a stable unchanging view of the files in the snapshot.

In at least one of the various embodiments, during a snapshot process a each node cache that may be holding relevant cached data block writes may record a snapshot sentinel in the node cache. In at least one of the various embodiments, a snapshot sentinel may indicate that a snapshot may have been created. In at least one of the various embodiments, a snapshot sentinel may also be associated with the data blocks in the node cache that may be relevant to the snapshot referenced by the snapshot sentinel. Also, snapshot sentinels may include enough information in a data structure to determine the particular snapshot that the snapshot sentinel may be associated with. In at least one of the various embodiments, including snapshot sentinels in the node cache to identify and/or preserve the relevant cached data blocks may enable the caching operations to continue uninterrupted. In at least one of the various embodiments, adding a snapshot sentinel to a node cache may seamlessly integrate into the node cache operation because it may be a simple write-to-cache operation similar to caching data blocks.

In at least one of the various embodiments, node cache 506 and node cache 508 may retain the cached data blocks for file 510 even after the creation of snapshot 512. The snapshot 512 may consist of data blocks in at least two states, stable and unstable. In at least one of the various embodiments, data blocks of snapshot 512 that may be stored in stable storage may be considered in a stable state. In at least one of the various embodiments, data blocks that may be stored in node caches may be considered to be in an unstable state. Accordingly, data blocks associated with a snapshot that may be in node caches may be considered to be in an unstable state. Conversely, data blocks associated with a snapshot that may be stored in stable storage may be considered to in an stable state.

In at least one of the various embodiments, if a process on node 516 requests to read data blocks from snapshot 512. In at least one of the various embodiments, if read request 514 includes data blocks that may be in a node cache (e.g., data blocks from the stable portion of snapshot) the read operation may return the data blocks from the snapshot from stable storage to the reader. However, in at least one of the various embodiments, if read request 514 may request to read data blocks that may be stored in a node cache, such as node cache 506, then the relevant data blocks may be flushed from the node cache to stable storage before the data blocks may be returned to the reader. In at least one of the various embodiments, after flushing data blocks associated with a snapshot to stable storage those flushed data blocks become part of the stable portion of the snapshot. Thus, subsequent snapshot reads of the flushed data blocks may be returned to the reader directly from the stable portion of the snapshot.

For example, in at least one of the various embodiments, if node 516 makes read request 514 seeking to read data blocks in range "50-350" from snapshot 512, a versioned coalescer may determine that the requested data block range overlaps with the range of data blocks that may be held in node cache 506. In at least one of the various embodiments, after determining that data blocks relevant to a read from a snapshot may be in node cache 506, the versioned coalescer may flush the relevant data blocks from node cache 506 to stable storage before read request 514 from node 516 may be completed. In at least one of the various embodiments, the data blocks stored in node cache 508 may be outside the range required by the read request 514 from node 516 and may remain in an stored in node cache 508 and considered unstable state until a read request that includes data blocks that overlap the range of "550-750" may be made.

In at least one of the various embodiments, if snapshot 512 may be created and node cache 508 crashes or otherwise becomes unavailable before any process attempts to read snapshot 512 in the range of data blocks "550-750" those data blocks may be lost. If a read request may be made for a range of data that may include data blocks stored in an unavailable node cache the versioned coalescer may disregard the lost data blocks and if available, may return older data blocks from the corresponding stable storage.

In at least one of the various embodiments, readers making read requests for data from snapshots may only receive data blocks that may be in a stable state. Any data blocks that may be lost due to a crashed or unavailable node cache may not become part of the stable snapshot. Thus, in at least one of the various embodiments, from the point of view of the reader the lost data blocks may never have become part of snapshot.

In at least one of the various embodiments, if a reader may request data from a snapshot version the read request may include a parameter, or otherwise indicate to the versioned coalescer the snapshot identifier that the reader may be requesting to read. For example, a file access system call or API for reading from a snapshot may similar to: read(snapshot-identifier, fileID, blocks-to-read). In at least one of the various embodiments, the relevant snapshot identifier may be supplied expressly or it may be determined from the context of the operations. One of ordinary skill in the art will appreciate that there are many ways to determine to the relevant snapshot, including user-interface settings, command line arguments, API parameters, environment variables, configuration files, or the like.

Furthermore, in at least one of the various embodiments, snapshots may be made of files, file system directories/folders and their contents, entire file system contents, or the like. Also, in at least one of the various embodiments, a versioned coalescer may be arranged to periodically make snapshots based on rule based policies or configurations. In at least one of the various embodiments, snapshots may be created based on a time period such as, hourly, daily, weekly, monthly or the like. In at least one of the various embodiments, other rules may be enabled such as creating snapshots based on, the number of writes made to file, the size or size change of file(s), age of file(s), or the like.

In at least one of the various embodiments, after a snapshot may have been created it may be made available to authorized users and/or processes that may be resident or non-resident users of the distributed file system. In at least one of the various embodiments, the snapshot identifier and associated identifying meta-data such as, name, time, date, description, access-lists, or the like, may stored in a database table, list, or the like, and made available to authorized users of the distributed file system. In at least one of the various embodiments, the snapshot and the snapshot identifier may stored in the distributed file system, another distributed file system, dedicated stable storage, or the like.

Figure 6:
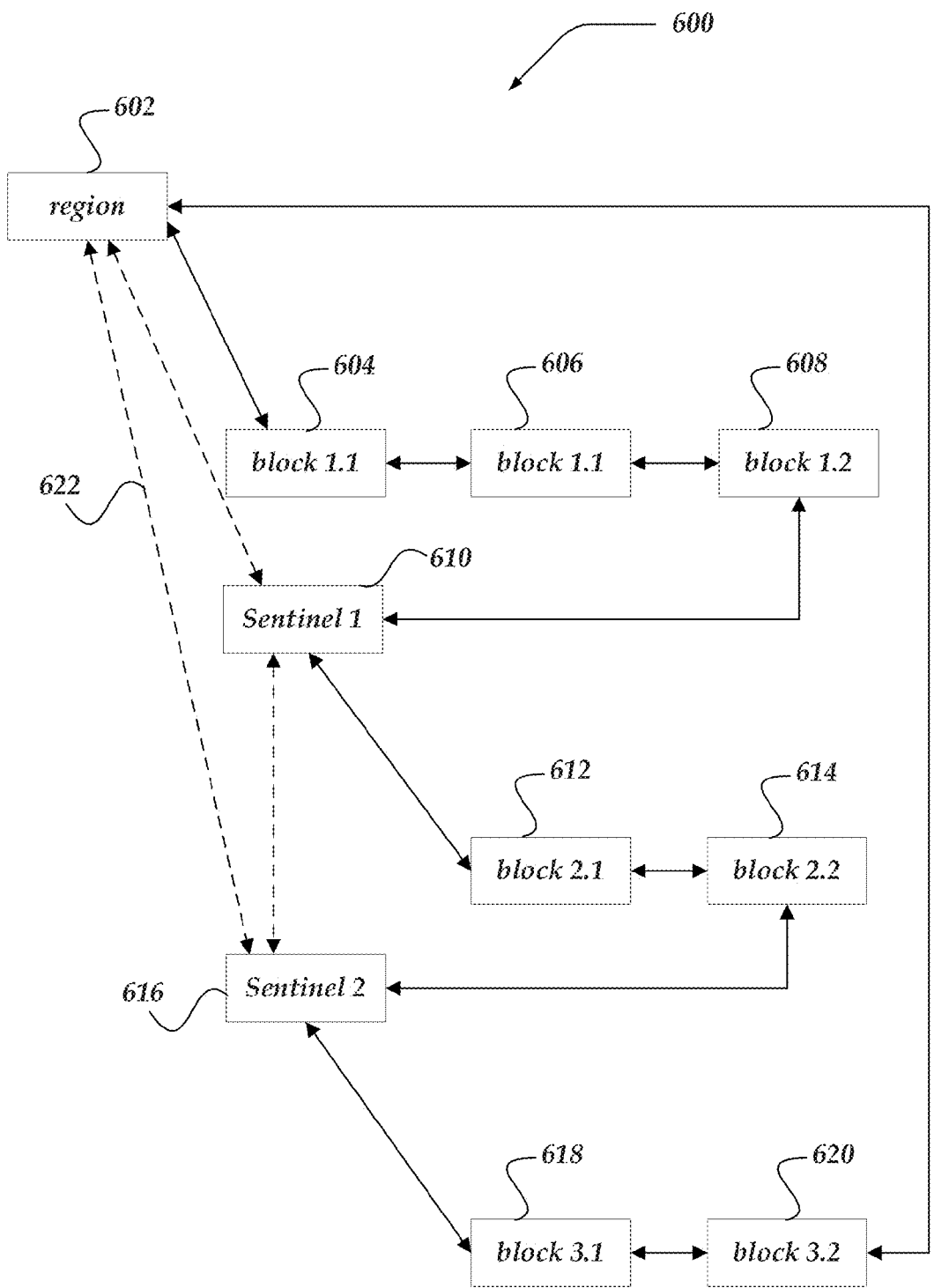
FIG. 6 illustrates a data structure that may be used for node caches in accordance with at least one of the various embodiments.

FIG. 6, illustrates for at least one of the various embodiments, a node cache 600. In at least one of the various embodiments, files stored in distributed file system may be arranged into regions and within regions there may be data blocks. In at least one of the various embodiments, region 602 may be associated with range of data blocks from a file in a distributed file system. For example, an embodiment may be configured so region 602 may be arranged to correspond to data blocks in the range "100-300" from file 310. Accordingly, if data blocks within the range of "100-300" require caching they may be stored in node cache 600 and associated with region 602. If node cache 600 receives a data blocks corresponding to data blocks within the range of "100-300" for file 312 they may associated with region 302. Also, a node cache may contain a plurality of regions (just one region shown in FIG. 6) from one or more files in the distributed file system.

In at least one of the various embodiments, if a node cache 600 receives data blocks corresponding to a file, the data blocks may be cached. For each data block received by node cache 600 a region 602 may be determined by a versioned coalescer. In at least one of the various embodiments, if an appropriate region may be identified a data block may be associated with the identified region. If the cache may not have an appropriate region, a new region data structure may be created. For example, in an embodiment, if a node is writing a data block for a file that may be determined to be associated with region 602, a versioned coalescer may add the data block to the region in the node cache. In at least one of the various embodiments, for node cache 600, data blocks 604-608 may be data blocks associated with region 602. In at least one of the various embodiments, data blocks may be comprised of a linked list of data blocks that may have a head pointer to region 602. As new data blocks may be added to region 602 they may be appended to the list of cached data blocks. In at least one of the various embodiments, data blocks may be inserted in sorted order relative to their location in the underlying file, or the data blocks may be appended to end of the list.

In at least one of the various embodiments, if it is time to flush the contents of node cache 600 to stable storage, the versioned coalescer may scan node cache 600 to identify data regions contained in the cache. For each region identified, the versioned coalescer may traverse the regions' data structure to find data blocks that may require flushing from the node cache to stable storage. In at least one of the various embodiments, if a data block may have been flushed to stable storage the data block may be removed and/or disassociated from the cached region 602.

In at least one of the various embodiments, snapshot sentinel 610 may indicate that data blocks in region 602 may be part of snapshot. Snapshot sentinels may be arranged such that the data blocks in regions that may be associated with a snapshot may be unambiguously identified. In at least one of the various embodiments, snapshot sentinel 610 may be correspond to snapshot "1". Accordingly data blocks 604, 606, and 608 may be associated to snapshot "1" as indicated by the position of snapshot sentinel 610. Likewise, snapshot sentinel 616 may be associated with data blocks 612 and 614, as well as data blocks 604, 606, and 608. Conversely, data blocks 618 and 620 may not be associated with a snapshot because they may not be within the boundary of a snapshot sentinel. Further, in at least one of the various embodiments, region 602 may include direct references, or pointers, to the snapshot sentinels such as pointer 622. This type of meta-data may be used simplify and accelerate access to snapshot sentinels and subsequently determine the data blocks inside or outside of the snapshot sentinels boundary.

In at least one of the various embodiments, a snapshot sentinel may be implemented using a data structure sufficient to identify the data blocks that may be associated with a snapshot. Thus, embodiments may not be limited to the data structures depicted in FIG. 6.

Figure 7:
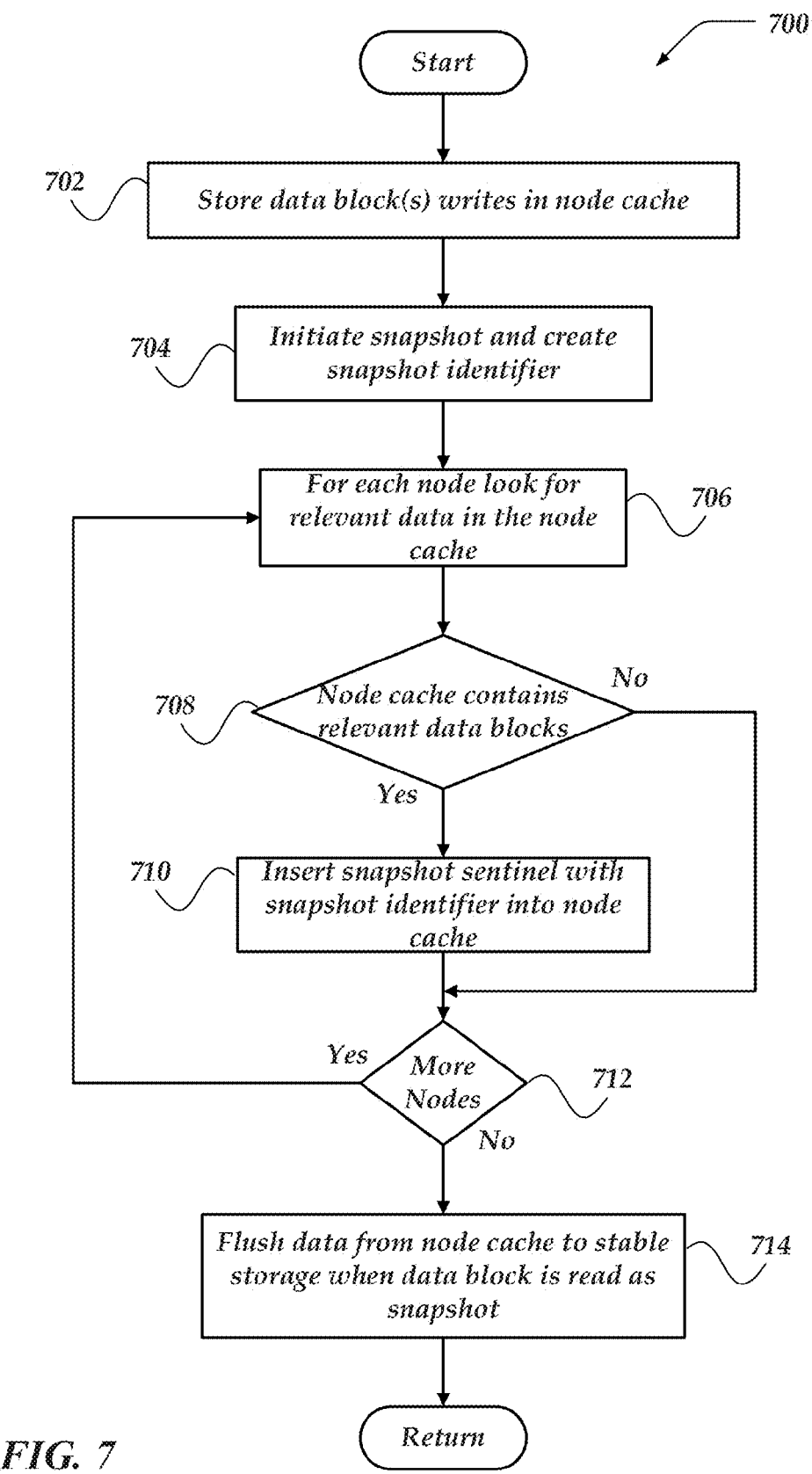
FIG. 7 shows a flowchart for a process for creating snapshots in accordance with at least one of the various embodiments.

FIG. 7 shows a flowchart for process 700 for at least one of the various embodiments for creating snapshots. After start block, at block 702 in at least one of the various embodiments, data blocks received from one or more clients of the distributed file system writing to one or more files within a distributed file system may be stored in a node cache. In at least one of the various embodiments, as writes are received corresponding data blocks may be written to the node cache. Each data block may be associated with a region that may correspond with a particular underlying file in the file system. Next, at block 704 a versioned coalescer may initiate a snapshot and create a snapshot identifier. In at least one of the various embodiments, a snapshot identifier may be unique to point where it may be used to distinguish among other snapshots in the system. In at least one of the various embodiments, snapshot ID's may comprise randomly generated values, such as a GUID, or the like. In at least one of the various embodiments, snapshot identifier may also be based on a hash of a timestamp and additional meta-data such as, snapshot name, snapshot owner, or the like. Further, in at least one of the various embodiments, snapshot identifier's may point to record in a data table (e.g., database table, XML file, INI file, or the like) that may contain additional information related to the snapshot, such as, owner, time created, age, last time accessed, name, description, storage location, or the like.

At block 706, in at least one of the various embodiments, each node may be examined to determine if its dedicated node cache may contain regions and data blocks relevant to the pending snapshot. In at least one of the various embodiments, a snapshot may be related to file, a set of files, a portion of a file system (e.g., one or more directories or folders in a file system), the entire file system, or the like. Each node cache may need to be examined to see if it contains data blocks relevant to the file(s) in snapshot. In at least one of the various embodiments, a versioned coalescer may enumerate each node cache in a distributed file system cluster to discover if the node cache contains data blocks relevant to the pending snapshot. In at least one of the various embodiments, a versioned coalescer may use a centralized caching application that may maintain an index of data block ranges stored by each node cache. Further, in at least one of the various embodiments, in response to a broadcast message containing the particulars of the pending snapshot the versioned coalescer on each node may report if the node cache may contain data blocks relevant to the pending snapshot.

At decision block 708, if a node cache may contain regions and/or data blocks relevant to the pending snapshot then continue to block 710. Otherwise, continue to decision block 712. At block 710, for each relevant region stored in the node cache, insert a snapshot sentinel containing the snapshot identifier into the region to identify data blocks that may be associated with the pending snapshot. At decision block 712, if more nodes may require examining, loop back to block 706. Otherwise, because the snapshot sentinel insertion process may be complete control may flow to block 714.

At block 714, if read requests may be received for data blocks associated with the snapshot then flush the data blocks from the node cache to stable storage before the data blocks in the cache may be return to readers. Next, control may be returned to a calling process.

Figure 8:
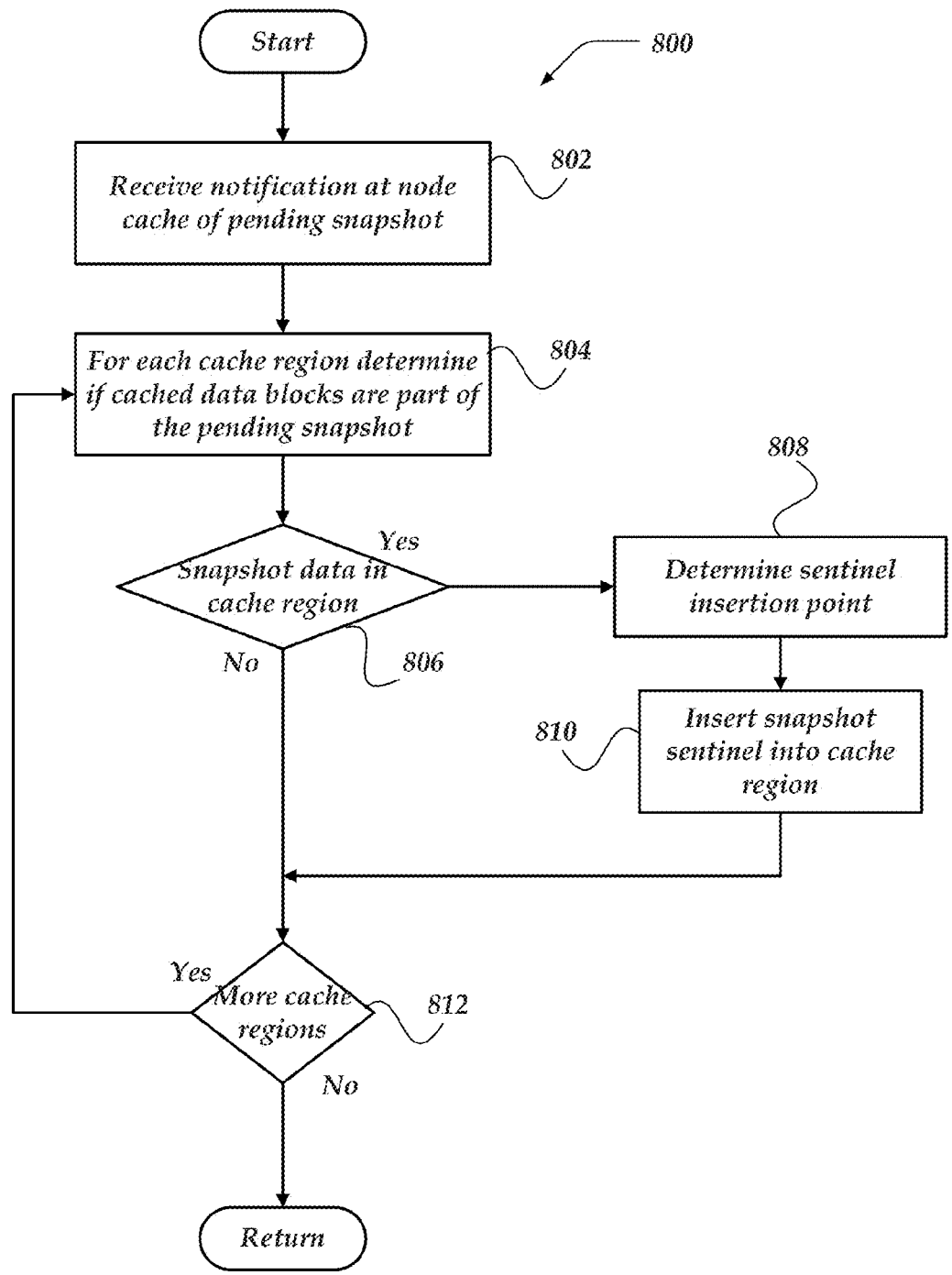
FIG. 8 shows a flowchart for a process for inserting snapshot sentinels into a node cache in accordance with at least one of the various embodiments.

FIG. 8 shows a flowchart for process 800 of at least one of the various embodiments, for inserting snapshot sentinels into a region of a node cache. After a start block, at block 802 a node cache may receive notification of a pending snapshot. In at least one of the various embodiments, the notification may comprise one or more ways to identify the file(s), regions, and/or data blocks that may be part of the pending snapshot.

Next, at block 804, a versioned coalescer may examine the region in the node cache to determine if the region contains data blocks relevant to the pending snapshot. In at least one of the various embodiments, files in a distributed file systems may be organized into regions of data blocks. In at least one of the various embodiments, the regions in the node caches may correspond to regions in the underlying file and may be identified by file identifiers and region identifier corresponding to region identifiers in the underlying file. In at least one of the various embodiments, regions may be indexed in the node cache by the versioned coalescer. In at least one of the various embodiments, each index may map from the corresponding underlying file region to the region stored in the node cache. In at least one of the various embodiments, regions of the underlying file may be mapped to corresponding regions on a node cache by using techniques that may include lookup tables, b-trees, hash tables, sorted lists, unsorted lists, or the like.

At decision block 806 if is determined that data blocks relevant to the pending snapshot may be included in a particular region, control may flow to block 808. Otherwise, control may flow to decision block 812.

At block 808, in at least one of the various embodiments, further examination is done on the cached data blocks associated with the determined region to identify where to place a snapshot sentinel. In at least one of the various embodiments, the region data structure may be scanned to find the latest cached data block. In at least one of the various embodiments, the region may maintain meta-data that may be examined to determine where a snapshot sentinel should be placed, such as, an index, one or more pointers pointing to the last data block received, counters, skip lists, or the like. In other embodiments, the region data structure may be traversed to determine the correct insertion point for the snapshot sentinel.

Next at block 810, in at least one of the various embodiments, the snapshot sentinel may be inserted into the region (e.g., FIG. 6, snapshot sentinel 610 and 616). In at least one of the various embodiments, a snapshot sentinel may be a reference to data blocks within the region that may be part of the pending snapshot, such as, a table record containing list of data blocks in the region that may be associated with the pending snapshot. Next, control flows to decision block 812.

At decision block 812 if there may be more regions in the node cache to examine control may loop back to block 804. Otherwise, control may be returned to a calling process.

Figure 9:
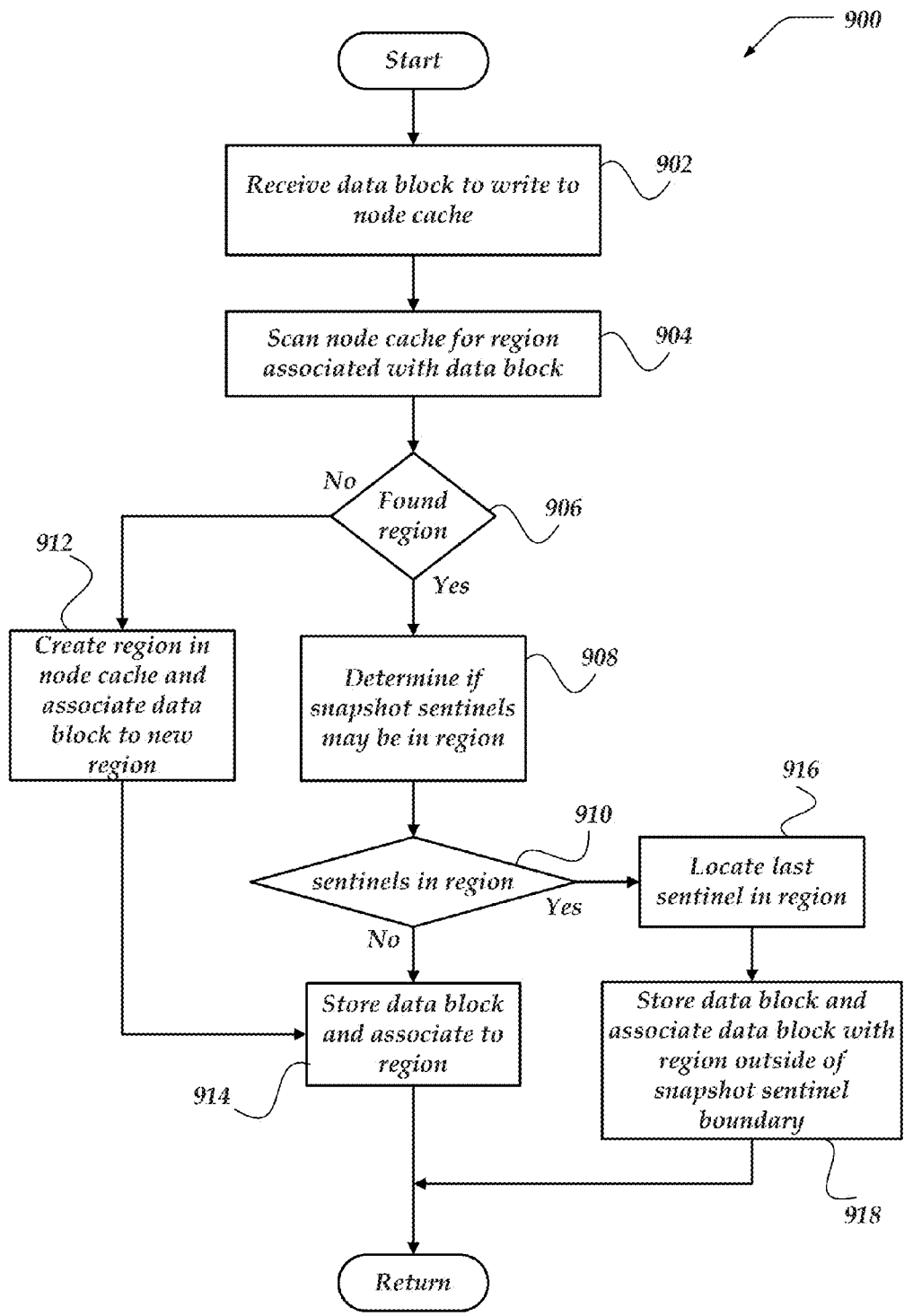
FIG. 9 shows a flowchart for a process for writing a data block to a node cache in accordance with at least one of the various embodiments.

FIG. 9 shows a flowchart for a process 900 of at least one of the various embodiments, for writing a data block to a node cache. After a start block, at block 902 a versioned coalescer may receive data blocks to write to a node cache. At block 904, a node cache may be examined to determine if a region associated with the data block may exist in the node cache. At decision block 906, if a region associated with the incoming data block may be located in the node cache, control may advance to block 908. Otherwise, control may flow to block 912 where a versioned coalescer may create a new region in the node cache for the incoming data block.

At block 908, the found region may be examined to determine if snapshot sentinels may be associated with the region. In at least one of the various embodiments, a versioned coalescer may identify snapshot sentinels by scanning the region data to identify embedded snapshot sentinels, such as sentinel 610 and sentinel 616 (See, FIG. 6). In at least one of the various embodiments, region 602 (in FIG. 6) may contain meta-data fields that may indicate if snapshot sentinels may be associated with the region. At decision block 910, if relevant snapshot sentinels may not be in the region, control may flow block 914.

At block 914, the received data block may be written into the node cache. See, also FIG. 6, data blocks 604-608. In at least one of the various embodiments, if a node cache may be comprised of region 602 and blocks 604-608 (exclude the other elements in FIG. 6 for this particular example), a new data block destined for caching in region 602 may be appended to the data block list by linking it to data block 608. In at least one of the various embodiments, if the data block may be associated with a new region, such as one created in block 912, the resulting node cache may contain a new region with a single data block. In at least one of the various embodiments, node caches may use data structure other than the data structure depicted in FIG. 6, such as, lists, btrees, associative arrays, stacks, graphs, or the like.

At block 916, in at least one of the various embodiments, because the region associated with the incoming data block may contain snapshot sentinels, additional processing may occur to determine where the data block may be stored in the region on the node cache. In at least one of the various embodiments, a node cache may be arranged into a structure as depicted in FIG. 6. Region 602 may have one or more snapshot sentinels, including snapshot sentinel 610 and snapshot sentinel 616. In at least one of the various embodiments, having a data structure similar to FIG. 6, the latest (newest) sentinel snapshot may be determined to be snapshot sentinel 616.

Next, control may flow to block 918 where, in at least one of the various embodiments, the incoming data block may be inserted into region 602 at a location indicating that the data block may not be part of previous snapshots. In at least one of the various embodiments, for a cache comprising region 602 (as depicted in FIG. 6) an incoming data block may be appended to data block 620. This may place the data block outside of the boundary of snapshot sentinel 616 and snapshot sentinel 610. Next, control may be returned to a calling process.

Figure 10:
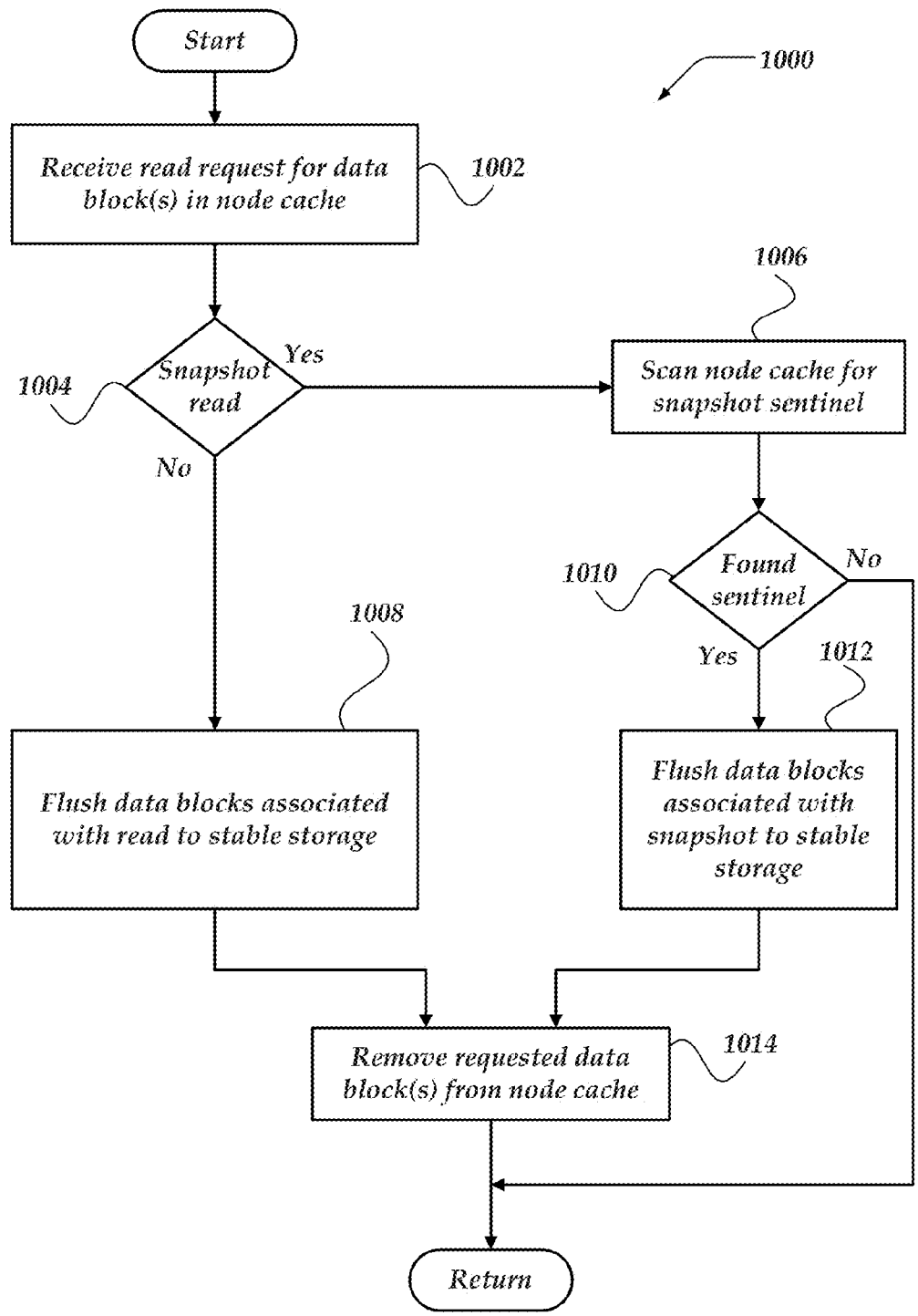
FIG. 10 shows a flowchart for a process for flushing a data block from a node cache to stable storage in accordance with at least one of the various embodiments.

FIG. 10 shows a flowchart for process 1000 for flushing a data block from a node cache to stable storage for at least one of the various embodiments. After a start block, at block 1002, a read request is received for data blocks that may be held in the node cache. At decision block 1004, if the read request includes sufficient parameters that may indicate that the read is directed towards data blocks associated with a previously created snapshot, control may flow to block 1006. Otherwise, if the read may not be associated with a snapshot, control may flow to block 1008.

At block 1008, data blocks from the node cache that relevant to the read request may be flushed from the node cache to stable storage corresponding to the underlying file.

At block 1006, the node cache may be examined to determine if the node cache contains data blocks that may be associated with the snapshot indicated in the read request. In at least one of the various embodiments, the read request may include an identifier, such as a snapshot ID, that identifies the snapshot that the read may be directed towards. In at least one of the various embodiments, a versioned coalescer may examine the regions stored in a node cache, such as region 602 in node cache 600 (FIG. 6). In at least one of the various embodiments that may be arranged similarly to node cache 600 in FIG. 6, the set of data blocks associated with the targeted snapshot may be identified as the data blocks bounded by a snapshot sentinel. For example, in one embodiment snapshot sentinel 610 binds data blocks 604 through 608 to snapshot "1". Likewise, snapshot sentinel 616 may bind data blocks 612 and 614 to snapshot "2".

At decision block 1010, if snapshot identifier is not found in the node cache, this may indicate that this node cache does not contain any data blocks relevant to the received read request so control may be returned to a calling process. Otherwise, control may flow block 1012.

At block 1012, in at least one of the various embodiments, the data blocks associated with the received snapshot identifier may be examined to determine if the data blocks may be relevant to the read request. In at least one of the various embodiments, data blocks in the node cache that may be associated with the received snapshot identifier and may be relevant to the read request may flushed to stable storage corresponding to the underlying file. In at least one of the various embodiments, for a region associated to the received snapshot all of the data blocks, or portion of the data blocks, may be flushed to stable storage at the same time. In another embodiment, the data blocks flush to stable storage may be limited to data blocks associated with the received snapshot and specifically identified in the read request. Next, control may flow to block 1014.

At block 1014, in at least one of the various embodiments, the data blocks that may have been flushed from the cache to stable storage may be removed from the node cache. In at least one of the various embodiments, flushed data block may be expressly deleted from the cache as they may flush to the underlying file's stable storage. In another embodiment, flushed data block may be marked for deletion and may be removed from the cache later. If relevant reads may be addressed to the cache before a data block marked as deleted has been removed from the cached the versioned coalescer may be arranged to ignore the data blocks that may be marked deleted.

In at least one of the various embodiments, if a versioned coalescer flushes a data block from unstable storage to stable storage, a lock may be obtained by the versioned coalescer on the stable storage data for of file corresponding to the data blocks held in the unstable storage. If a lock is obtained the versioned coalescer may copy the data blocks from the unstable storage to the stable storage. If the copy succeeds the versioned coalescer may release the lock on the stable storage of the file.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for enabling a plurality of network devices to cache at least one data block written to a file in a distributed file system, comprising:
   enabling at least one of a plurality of node caches to store the at least one data block that is written to the file;
   in response to a request to generate a snapshot of at least a portion of the distributed file system, generating a snapshot identifier for at least that portion;
   determining each node cache that includes at least a part of the at least one portion of the distributed file system that corresponds to the requested snapshot;
   determining each corresponding node cache that further includes the at least one data block;

19 determining an insertion point for a sentinel within each corresponding node cache based on a scan to find a latest cached data block within each corresponding node cache;

inserting the sentinel into each corresponding node cache that includes the at least one data block, wherein the sentinel includes at least the snapshot identifier;

generating the snapshot based on the at least one data block that corresponds to the sentinel in each corresponding node cache along with those remaining data blocks for the at least portion of the distributed file system that were previously stored in a stable storage device; and providing access to the snapshot in a response to the request.

2. The method of claim 1, further comprising in response to a request to read the at least one data block in a corresponding node cache, flushing the at least one data block from the corresponding node cache for storage in the stable storage device.

3. The method of claim 1, wherein storing the at least one data block further comprises determining an existing region within the at least one node cache for storing the at least one data block.

4. The method of claim 1, wherein storing the at least one data block, further comprises if an existing region is determined to be unavailable for storing the at least one data block in the at least one node cache, generating a new region within the at least one node cache for storing the at least one data block.

5. The method of claim 1, wherein inserting the sentinel further comprises inserting the sentinel in an available region that includes the at least one data block in the corresponding node cache.

6. The method of claim 1, wherein generating the snapshot further comprises concurrently enabling caching by the plurality of node caches.

7. A network device for enabling a plurality of devices to cache at least one data block written to a file in a distributed file system, comprising:

a memory for storing instructions and data; and a processor that is arranged to execute the instructions to enable actions, including:

enabling at least one of a plurality of node caches to store the at least one data block that is written to the file;

in response to a request to generate a snapshot of at least a portion of the distributed file system, generating a snapshot identifier for at least that portion;

determining each node cache that includes at least a part of the at least portion of the distributed file system that corresponds to the requested snapshot;

determining each corresponding node cache that further includes the at least one data block;

determining an insertion point for a sentinel within each corresponding node cache based on a scan to find a latest cached data block within each corresponding node cache;

inserting the sentinel into each corresponding node cache that includes the at least one data block, wherein the sentinel includes at least the snapshot identifier;

generating the snapshot based on the at least one data block that corresponds to the sentinel in each corresponding node cache along with those remaining data blocks for the at least portion of the distributed file system that were previously stored in a stable storage device; and

20 providing access to the snapshot in a response to the request.

8. The network device of claim 7, further comprising in response to a request to read the at least one data block in a corresponding node cache, flushing the at least one data block from the corresponding node cache for storage in the stable storage device.

9. The network device of claim 7, wherein storing the at least one data block further comprises determining an existing region within the at least one node cache for storing the at least one data block.

10. The network device of claim 7, wherein storing the at least one data block, further comprises if an existing region is determined to be unavailable for storing the at least one data block in the at least one node cache, generating a new region within the at least one node cache for storing the at least one data block.

11. The network device of claim 7, wherein inserting the sentinel further comprises inserting the sentinel in an available region that includes the at least one data block in the corresponding node cache.

12. The network device of claim 7, wherein generating the snapshot further comprises concurrently enabling caching by the plurality of node caches.

13. A system for enabling a plurality of devices to cache at least one data block written to a file over a network, comprising:

a distributed file system;

a network device, including:

a memory for storing instructions and data; and a processor that is arranged to execute the instructions to enable actions, including:

enabling at least one of a plurality of node caches to store the at least one data block that is written to the file;

in response to a request to generate a snapshot of at least a portion of the distributed file system, generating a snapshot identifier for at least that portion;

determining each node cache that includes at least a part of the at least portion of the distributed file system that corresponds to the requested snapshot;

determining each corresponding node cache that further includes the at least one data block;

determining an insertion point for a sentinel within each corresponding node cache based on a scan to find a latest cached data block within each corresponding node cache;

inserting the sentinel into each corresponding node cache that includes the at least one data block, wherein the sentinel includes at least the snapshot identifier;

generating the snapshot based on the at least one data block that corresponds to the sentinel in each corresponding node cache along with those remaining data blocks for the at least portion of the distributed file system that were previously stored in a stable storage device; and providing access to the snapshot in a response to the request.

14. The system of claim 13, further comprising in response to a request to read the at least one data block in a corresponding node cache, flushing the at least one data block from the corresponding node cache for storage in the stable storage device.

15. The system of claim 13, wherein storing the at least one data block further comprises determining an existing region within the at least one node cache for storing the at least one data block.

16. The system of claim 13, wherein storing the at least one data block, further comprises if an existing region is determined to be unavailable for storing the at least one data block in the at least one node cache, generating a new region within the at least one node cache for storing the at least one data block.

17. The system of claim 13, wherein inserting the sentinel further comprises inserting the sentinel in an available region that includes the at least one data block in the corresponding node cache.

18. The system of claim 13, wherein generating the snapshot further comprises concurrently enabling caching by the plurality of node caches.

19. A processor readable non-volatile non-transitory storage media, wherein the media includes instructions for enabling a plurality of network devices to cache at least one data block written to a file in a distributed file system, and wherein execution of the instructions by a processor enables actions, comprising:
- enabling at least one of a plurality of node caches to store the at least one data block that is written to the file;
- in response to a request to generate a snapshot of at least a portion of the distributed file system, generating a snapshot identifier for at least that portion;
- determining each node cache that includes at least a part of the at least portion of the distributed file system that corresponds to the requested snapshot;
- determining each corresponding node cache that further includes the at least one data block;
- determining an insertion point for the sentinel within each corresponding node cache based on a scan to find a latest cached data block within each corresponding node cache;
- inserting the sentinel into each corresponding node cache that includes the at least one data block, wherein the sentinel includes at least the snapshot identifier;
- generating the snapshot based on the at least one data block that corresponds to the sentinel in each corresponding node cache along with those remaining data blocks for the at least portion of the distributed file system that were previously stored in a stable storage device; and
- providing access to the snapshot in a response to the request.

20. The media of claim 19, further comprising in response to a request to read the at least one data block in a corresponding node cache, flushing the at least one data block from the corresponding node cache for storage in the stable storage device.

21. The media of claim 19, wherein storing the at least one data block further comprises determining an existing region within the at least one node cache for storing the at least one data block.

22. The media of claim 19, wherein storing the at least one data block, further comprises if an existing region is determined to be unavailable for storing the at least one data block in the at least one node cache, generating a new region within the at least one node cache for storing the at least one data block.

23. The media of claim 19, wherein inserting the sentinel further comprises inserting the sentinel in an available region that includes the at least one data block in the corresponding node cache.

24. The media of claim 19, wherein generating the snapshot further comprises concurrently enabling caching by the plurality of node caches.

* * * * *